United States Patent [19]
Niederman et al.

[11] Patent Number: 6,039,348
[45] Date of Patent: Mar. 21, 2000

[54] VARIABLE OUTPUT INFLATOR WITH ADAPTIVE HEAT SINKING

[75] Inventors: Robert Raymond Niederman, Chandler, Ariz.; Allen Richard Starner, Springboro; Shawn Gregory Ryan, Dayton, both of Ohio

[73] Assignee: General Motors Corporation, Detroit, Mich.

[21] Appl. No.: 09/169,269

[22] Filed: Oct. 9, 1998

[51] Int. Cl.[7] .................................................. B60R 21/26
[52] U.S. Cl. .......................................................... 280/741
[58] Field of Search .................................. 280/741, 742, 280/740, 737, 736

[56] References Cited

U.S. PATENT DOCUMENTS

| | | | |
|---|---|---|---|
| 3,871,684 | 3/1975 | Staudacher et al. | |
| 3,877,882 | 4/1975 | Lette et al. | 23/281 |
| 4,950,458 | 8/1990 | Cunningham | 422/164 |
| 5,219,178 | 6/1993 | Kobari et al. | 280/741 |
| 5,487,561 | 1/1996 | Mandzy et al. | 280/741 |
| 5,649,720 | 7/1997 | Rink et al. | 280/737 |
| 5,709,406 | 1/1998 | Buchanan | 280/741 |
| 5,794,973 | 8/1998 | O'Loughlin et al. | 280/741 |
| 5,799,973 | 9/1998 | Bauer et al. | 280/741 |

*Primary Examiner*—Kenneth R. Rice
*Attorney, Agent, or Firm*—Kathryn A. Marra

[57] ABSTRACT

A variable output air bag inflator is presented wherein in one embodiment the inflator offers variable output and may be implemented with either pyrotechnic or hybrid inflators. The inflator offers full level deployment at a first end of the inflator unit and reduced level deployment at a second end. This is accomplished by providing two discrete paths for the inflator gas to flow during deployment of the air bag cushion. One path communicates with a first filter material or permits the hot inflation gas to directly exit the inflator without passing through a filter material. The other path communicates with a second filter material which absorbs heat from the inflator gas as it passes through the second filter material before exiting the inflator, wherein the second filter material has a heat sink capacity greater than the first filter material. The energy content and pressure of the inflator gas is therefore regulated by directing the inflator gas through the second filter material.

15 Claims, 5 Drawing Sheets

VARIABLE OUTPUT INFLATOR WITH ADAPTIVE HEAT SINKING

TECHNICAL FIELD

The present invention relates generally to vehicle supplemental inflatable restraint systems and, more particularly, to an air bag inflator offering variable output performance from a single inflator unit.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

Known inflators for air bag cushions are generally of three types. One type is the pure gas inflator wherein a pressure vessel contains stored pressurized gas. The pressure vessel is communicated with the cushion through various types of rupturable outlets or diaphragms. Another type is the gas generator wherein a propellant is ignited and the resultant gases flow through an outlet to the cushion. A third type is the hybrid or augmented type. This type includes a pressure vessel containing stored pressurized gas and a gas generator disposed within the pressure vessel. When the generator is ignited, the resultant gas flows with the stored gas to the cushion through the pressure vessel outlet.

It is also known to inflate the cushion at a relatively low rate under sudden low level deceleration conditions and at a relatively high rate under sudden high level deceleration conditions. This can be accomplished in a pure gas type inflator by providing the pressure vessel with an outlet of variable flow area. In addition, devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide full level inflation. It is also known in the art to use a system having two discrete inflators to accomplish dual level inflation. In these types of systems, the two discrete inflators are deployed at the same time or at a delayed time depending upon the severity of the sudden deceleration.

SUMMARY OF THE INVENTION

It is a primary object of the invention to provide an alternate air bag inflator and method which permits variable level air bag performance from a single inflator having at least one filter which reduces the energy potential of the inflator gas at deployment under reduced level conditions.

Advantageously, the air bag inflator of the present invention allows multiple inflator outputs from a single inflator unit. The above and other advantages are accomplished in one embodiment of the present invention by providing an air bag inflator having a single pyrotechnic heater device and a first and second initiator. The air bag inflator of the present invention offers full level deployment at a first end of the inflator unit and reduced level deployment at a second end of the inflator. This is accomplished by providing two discrete paths for inflator gas to flow during deployment of the air bag cushion wherein each path communicates with a different filtration material, each material having a different efficiency of heat absorption of the inflator gas as it passes through the material before exiting the inflator and being directed to the air bag cushion. Alternatively, it is also within the scope of the present invention that the inflator includes only the second filtration material to provide reduced level deployment of the air bag and under full level deployment conditions, the inflator gas exits the inflator without passing through a filtration material. The energy content of the inflator gas, as well as, the pressure produced by the inflator are therefore regulated by the filtration material. Under full deployment conditions, the first initiator is activated and the hot inflator gas is directed to and flows through a first filtration material before the heated inflator gas exits the inflator or the hot inflator gas directly exits the inflator without passing through a filter material. Under reduced level deployment conditions, the second initiator is activated and hot inflator gas is directed to and flows through a second filtration material before exiting the inflator. Second filtration material comprises a selected filter having a greater heat sink capacity than the first filter material. The primary function of the second filtration material with increased heat sinking capacity is to absorb heat from the hot inflator gas as it flows therethrough and thereby reduce the energy content and pressure of the inflator gas. The inflator of the present invention also offers variable output performance by varying the heat content of the heated inflator gas that flows into the air bag cushion. The variable output performance is achieved by activating both initiators and the performance of the inflator is determined by when the second initiator is activated in relation to the activation of the first initiator.

In a second embodiment of the present invention, the inflator includes only a single initiator at one end for actuating the pyrotechnic device and variable output performance is provided by the positioning of a pyrotechnically actuated vent which is coupled to the upper wall of the inflator. The pyrotechnically actuated vent comprises a pyrotechnically actuated squib/initiator and a slide member having at least one vent port therein. Reduced level performance is provided in a first position by aligning the vent ports in the slide with openings in the upper wall of the inflator so that heated inflator gas may freely flow from the interior of the inflator into the first filtration material before exiting the inflator into the air bag cushion. Full level performance is provided in this embodiment by displacing the slide so that the vent ports and the openings in the upper wall are not aligned and are offset from one another, thereby the heated inflator gas is prevented from flowing into the first filtration material. The heated inflator gas exits through vent ports in the lower wall and optionally passes through a second filtration material before exiting the inflator.

In a third embodiment of the present invention, an alternative arrangement for the pyrotechnically actuated vent is presented, wherein the vent is coupled to the lower wall of the inflator. In a first position, a slide member prevents gas flow according to the full level deployment path, thus causing the inflator gas to flow according to the reduced level deployment path. A pyrotechnically actuated squib/initiator is actuated to displace and drive the slide member so that the full level deployment path is opened and the inflator gas will flow along the least restrictive gas path, which in this embodiment comprises the full level deployment path because this path communicates with less heat sink/filter material.

These and other objects and advantages of the invention will be apparent from the following description, the accompanying drawings, and the appended claims.

BRIEF DESCRIPTION OF THE DRAWINGS

Referring now to the drawings wherein like elements are numbered alike in the several Figures.

DETAILED DESCRIPTION OF THE PREFERRED EMBODIMENT

Figure 1:
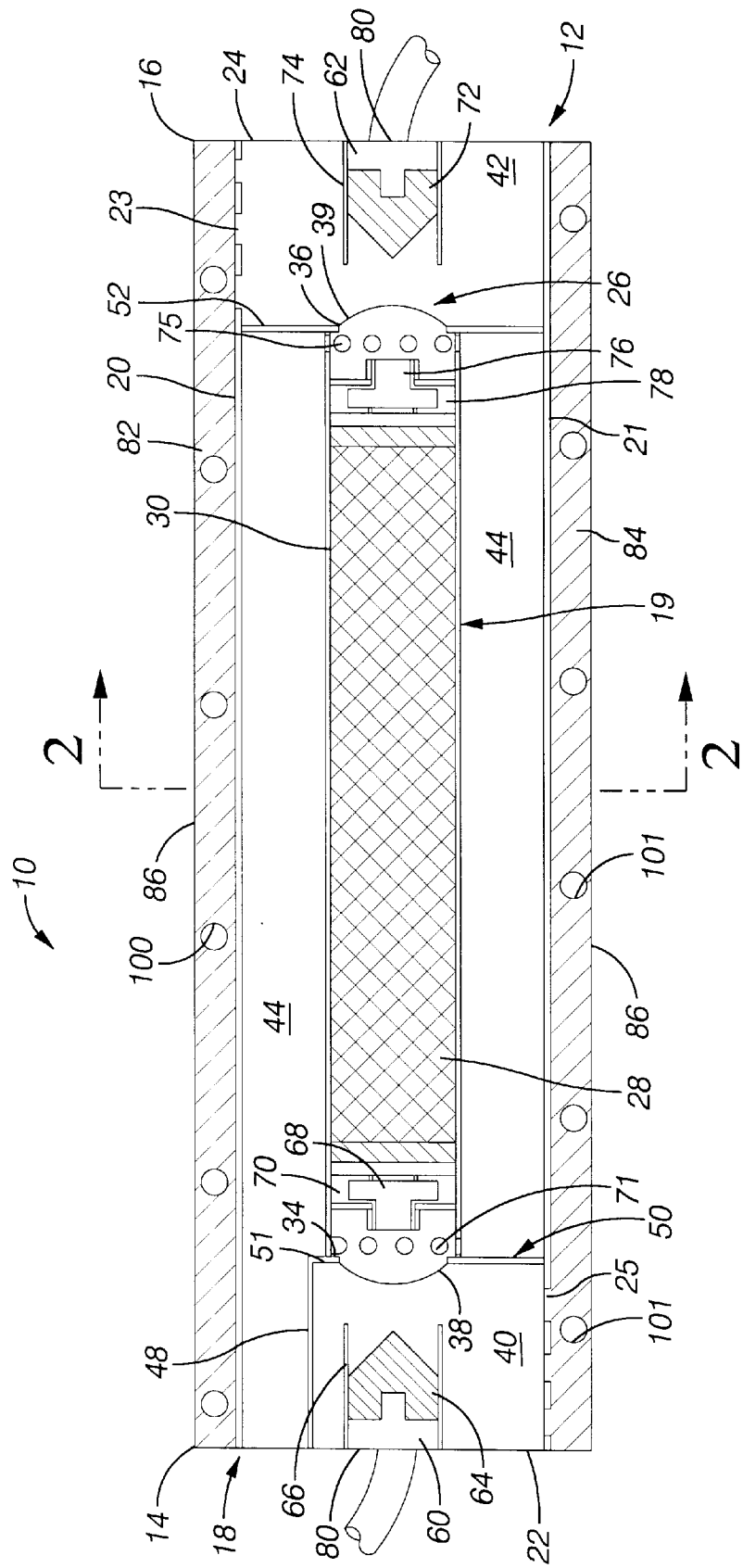
FIG. 1 is a cross-sectional side view of one embodiment of an air bag inflator embodying the present invention.
Figure 2:
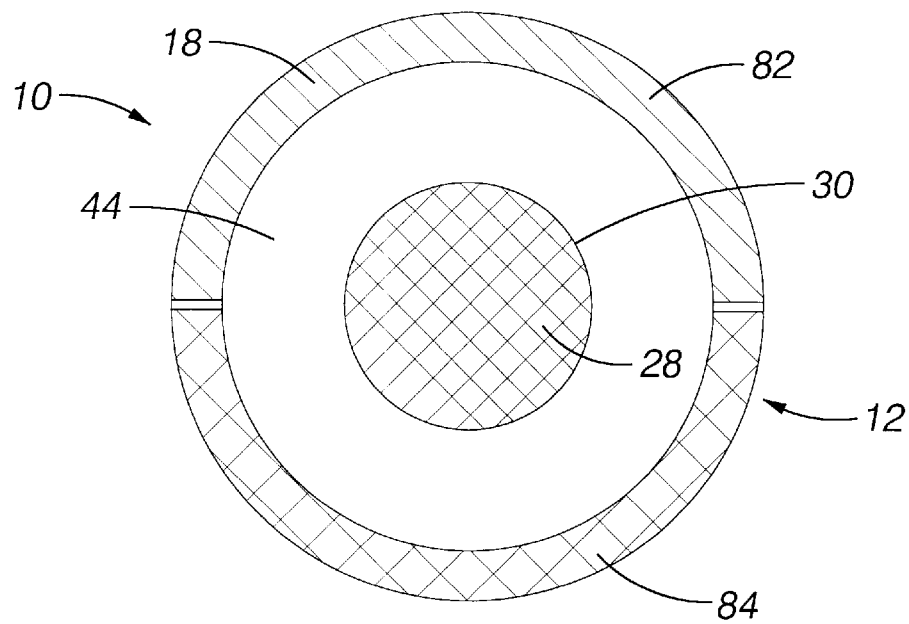
FIG. 2 is a cross-sectional view taken along the line 2—2 of FIG. 1.

Referring to FIGS. 1 and 2, a first embodiment of an inflator according to the present invention is generally designated by reference numeral 10. Inflator 10 is of a size and shape commonly used for mounting to an air bag module installed in the passenger side of a vehicle to protect the occupants of the vehicle (not shown). Inflator 10 is in the general form of a cylinder and includes an elongated tube or cylindrical housing 12. Housing 12 has a first end 14 and a second end 16 and housing 12 is typically formed of stamped steel, although other materials, including aluminum may be employed. Housing 12 includes a cylindrical wall 18 having an upper portion 20 and a lower portion 21 wherein upper portion 20 at second end 16 has at least one vent port 23 formed therein and lower portion 21 at first end 14 has at least one vent port 25 formed therein. Ends 14 and 16 of housing 12 are closed in a sealing manner wherein first end 14 of housing 12 is sealed by an end wall 22 and second end 16 is sealed by an end wall 24. Both ends walls 22 and 24 may be integrally formed with upper portion 20 and lower portion 21 of cylindrical wall 18 during a conventional extrusion process or by other means known in the art.

Walls 18, 22 and 24 define an interior 26 in which the various materials for producing the inflation are stored. Within interior 26 is a pyrotechnic heating device 19 which includes a cylindrical wall 30 forming a combustion chamber 28 therein. Pyrotechnic heating device 19 has a first end 34 and a second end 36 which are closed in a sealing manner by a burst disk 38 at first end 34 and a burst disk 39 at second end 36, each of which may be ruptured by the firing of respective initiators 60 and 62, as described hereinafter. Housing 12 contains first and second fluid conduits 40 and 42 and a storage chamber 44, wherein first conduit 40 is located at first end 14 of housing 12 and is formed by lower portion 20 of cylindrical wall 18, end wall 22, a bulkhead 48 and a first annular bulkhead 50 with first bulkhead 48 extending from end wall 22 of inflator 10 to an upper portion 51 of first annular bulkhead 50 wherein upper portion 51 is located at first end 34 of pyrotechnic heating device 19 adjacent burst disk 38 with the outer periphery of bulkhead 48 being suitably sealed to the inner side of wall 22 and to upper portion 51 of first annular bulkhead 50. Burst disk 38 at first end 34 of pyrotechnic heating device 19 is disposed within first conduit 40 so that when burst disk 38 is ruptured during deployment conditions, the hot inflator gas generated by pyrotechnic heating device 19 flows into first conduit 40 and is permitted to exit inflator 10 by means of vent ports 25 located at first end 14 of lower portion 21 of housing 12.

Second conduit 42 is located at second end 14 of housing 12 and is formed by cylindrical wall 18, end wall 24 and a second annular bulkhead 52. The outer periphery of second annular bulkhead 52 is suitably sealed by means (not shown) to the inner side of cylindrical wall 18 and cylindrical wall 30 of pyrotechnic heating device 19. Storage chamber 44 is formed by cylindrical wall 30, bulkhead 48, first annular bulkhead 50, second annular bulkhead 52 and cylindrical wall 18 wherein storage chamber 44 has inert gas, such as argon or other suitable inert gas, stored therein for inflating the air bag cushion. The outer periphery of annular bulkheads 50 and 52 is suitably sealed to the inner side of cylindrical wall 18 and cylindrical wall 30.

Hybrid inflators, as a general class, including inflator 10 of the present invention, provide a charge for igniting the stored gas. In the present invention, the stored gas is heated by the ignition of the pyrotechnic material disposed within combustion chamber 28. The pyrotechnic material is ignited by the firing of a first initiator 60, a second initiator 62 or a combination thereof, with first initiator 60 being located at first end 14 of inflator 10 and second initiator 62 being located at second end 13 of inflator 10. First initiator 60 and second initiator 62 are integrally coupled to end walls 22 and 24, respectively, of inflator 10. Initiator mechanisms are known in the art and suitable initiator mechanisms may be used in accordance with the present invention. First initiator 60 is disposed behind a projectile 64 in a projectile holder 66 which aligns projectile 64 with a striker 68 disposed within a striker holder 70 provided between cylindrical wall 30 of pyrotechnic heating device 19 at its first end 34. At first end 34, between striker 68 and burst disk 38, a plurality of openings 71 are formed in cylindrical wall 30 in an annular manner so that the stored inert gas is permitted to flow from storage chamber 44 and exit through ruptured burst disk 38 into first conduit 40. In a likewise manner, a plurality of openings 73 are formed in cylindrical wall 30 at second end 36 so that inflator gas may exit from storage chamber 44 through ruptured burst disk 39. Second initiator 62 is disposed behind a projectile 72 in a projectile holder 74 which aligns projectile 72 with a striker 76 disposed within a striker holder 78 provided between cylindrical wall 30 of pyrotechnic heating device 19 at second end 36. Initiators 60 and 62 have an electrical connector at one end 80 for connection to a controller (not shown) which sends signals to deploy inflator 10.

Although not shown in the drawings, it will be understood that initiators 60 and 62 are electrically connected to a known controller, e.g., a sensing and actuating system. Such a system may, for example, include velocity responsive sensors mounted on the vehicle bumper and acceleration or inertia responsive sensors mounted on a part of the vehicle occupant compartment, such as the fire wall. These sensors are set so as to sense the level of sudden deceleration. The inflator 10 is shown in FIG. 1 in an unactuated position and will be understood that the inflatable air bag cushion will be located in a folded position and mounted in a conventional manner within the occupant compartment, such as within the instrument panel.

Pyrotechnic heating device 19 includes a combustion chamber 28 disposed between cylindrical wall 30 and extending between striker holder 70 at first end 34 and striker holder 78 at second end 36. Pyrotechnic heating device 19 comprises devices which are known in the art and may comprise in one embodiment a predetermined mass of heating material (not shown) disposed in combustion chamber 28. The material may be one or more different materials, such as igniter and generant, which when subjected to a brief flash of heat produced by initiator 60 or 62, produces additional heat and may also produce an appreciable amount of gas. The production of heat is, however, typically most important in the deployment of the air bag cushion. In addition, pyrotechnic heating device 19 may include a primer (not shown) disposed within a primer housing (not shown) whereby the primer is designed to ignite when the striker is forced into it in response to the actuation of the associated initiator. An ignition train or a consumable pyrotechnic charge (not shown) may be disposed within pyrotechnic heating device 19 and would extend axially along the length of combustion chamber 28.

Upon receipt of the signal, e.g., an electric charge, from the controller and depending upon whether the controller communicates that a full or reduced level of deployment is desired, either initiator 60 or initiator 62 activates and causes the respective initiator to ignite. Ignition of initiator 60 or 62 develops sufficient pressure behind the respective projectile 64 or 72 to propel it through burst disk 38 or 39 and into striker 68 or 76, respectively. As soon as burst disk 38 or 39 is penetrated, the stored inert gas begins to flow from storage chamber 44 via openings 71 or 73 and through ruptured burst disk 38 or 39, respectively. Simultaneously, either striker 68 or 76 is forced into the primer or ignition train (not shown) producing a brief flash of heat which is effectively transferred to the combustible material contained within combustion chamber 28 causing the combustible material to ignite as a result of such heat transfer.

When the stored inert gas is subjected to the heat due to the combustion of combustible pyrotechnic material, the pressure of this gas rises. This pressure increase is augmented by the addition of any gas which is produced by the ignition and burning of the combustible material. This hot, high pressure gas is thus initially retained within storage chamber 44. Because burst disk 38 or 39 has been penetrated by projectile 64 or 72, respectively, the heated, high pressure gas may exit storage chamber 44 via the void created when burst disk 38 or 39 is ruptured. The hot inflator gas then flows through vent ports 23 or 25 depending upon the deployment conditions, as discussed hereinbelow, to a first filter 82 or a second filter 84, respectively, prior to flowing through a plurality of outlets 100 or 101 to its intended function, i.e., inflation of an air bag cushion. By increasing the temperature of the stored inert gas by mixing the hot, high pressure pyrotechnic generated gas therewith and by directly heating the stored inert gas, the pressure of the stored inert gas will accordingly also increase greatly. This pressure increase is sufficient to provide proper inflation of the air bag cushion.

In accordance with the present invention, inflator 10 offers variable output performance in a single inflator unit 10 by controlling the path of the heated inflator gas during deployment. In accordance with one embodiment of the present invention, two discrete paths for the heated inflator gas to flow from storage chamber 44 to the air bag cushion are provided wherein a first path is for the full level deployment of the air bag cushion and a second path is for the reduced level deployment of the air bag cushion.

In full level deployment conditions due to sudden high level deceleration, initiator 62 is ignited thereby causing projectile 72 to be propelled through burst disk 39 and into striker 76 which is thereby forced into either an ignition train or a primer (not shown) causing either to ignite and, in turn, the combustible material within combustion chamber 28 is ignited. The inert gas stored in storage chamber 44 is thereby heated as combustion of the material in combustion chamber 28 occurs and this heating raises the pressure of the stored inert gas and accordingly the stored inert gas expands. The hot inflator gas flows through the opening created when burst disk 39 ruptures and therefore, the hot inflator gas flows into second conduit 42 and then through vent ports 23 in upper portion 20 of cylindrical wall 18. The hot inflator gas generated by pyrotechnic heating device 19 and released through vent ports 23 passes into a first filter 82 wherein first filter 82 is disposed between upper portion 20 of cylindrical wall 18 and an annular outer wall 86 which surrounds upper portion 20 and lower portion 21 of cylindrical wall 18. First filter 82 comprises a suitable gas filter known in the art, e.g., a gas filtering screen, and is intended to clean the inert/hot inflator gas by filtering solid particulate from the inflator gas that may damage the air bag cushion. Annular outer wall 86 includes a plurality of outlets 100 for directing the hot inflator gas into the air bag cushion. Alternatively, inflator 10 may be provided without first filter 82 and the hot inflator gas exits inflator 10 through vent ports 23 and upper outlets 100. This first path for the hot inflator gas provides full level deployment performance. In reduced level deployment conditions due to sudden low level deceleration, initiator 60 is ignited and causes projectile 64 to be propelled through burst disk 38. After projectile 64 ruptures burst disk 38, it continues traveling in the direction toward striker 76 and is propelled into striker 76 which is thereby forced into either an ignition train or a primer (not shown) causing either to ignite and, in turn, the combustible material within combustion chamber 28 is ignited. The inert gas stored in storage chamber 44 is thereby heated as combustion of the material in combustion chamber 28 occurs and this heating action raises the pressure of the stored inert gas and accordingly the stored inert gas expands. The hot inflator gas flows through the opening created when burst disk 38 ruptures and, in turn, the hot inflator gas flows into second conduit 40 and then through vent ports 25 in lower portion 21 of cylindrical wall 18. After the hot inflator gas is released through vent ports 25, it flows into second filter 84 and passes therethrough before exiting inflator 10.

Second filter 84 is disposed between lower portion 21 of cylindrical wall 18 and annular outer wall 86. Second filter material 84 comprises suitable filter materials known in the art which have heat sink capacity, e.g., a gas filtering screen, and one of its functions is to clean the inert/hot inflator gas by filtering solid particulate that may damage the air bag cushion. Importantly, the primary function of second filter 84 is to absorb heat from the hot inflator gas as it flows therethrough and thereby reduce the energy content and pressure of the hot inflator gas. Therefore, second filter 84 is selected so that it has a higher capacity to heat sink than first filter 82 and by varying the type of second filter 84, the degree of heat sinking may be varied and controlled. Thus, the heat content of the inflator gas as it exits inflator 10 is reduced under reduced level deployment conditions because of the reduction in heat content/energy content of the inflator gas and this reduction results in lower pressure to the air bag cushion and consequently, a reduced level of air bag deployment during the deployment event. Hot inflator gas exits inflator 10 by means of lower outlets 101. This second path for the hot inflator gas provides reduced level deployment performance by reducing the heat content of inflator gas flowing into the air bag cushion due to a reduction in energy content and pressure of the inflator gas.

It is also within the scope of this invention that initiators 60 and 62 may both be activated under deployment conditions to achieve reduced level deployment of the air bag cushion by varying the heat content of heated inflator gas that flows into the air bag cushion. In this situation, the output performance of inflator 10 is variable and is determined by when initiator 60 is activated in relation to the activation of initiator 62. Depending upon the precise deployment conditions and the desired level of deployment, the activation of initiator 60 may be staged at anywhere between 0 and approximately 50 milliseconds after the activation of initiator 62. By staging initiator 60 to activate subsequent to the activation of initiator 62, the heat content of inflator gas exiting inflator 10 is variable and consequently, variable output performance is provided by inflator 10. A greater time differential between the activation of initiator 62 and initiator 60 results in a higher level of deployment performance because the heat content of the inflator gas flowing into the air bag cushion resembles more closely the expanded volume of hot inflator gas that flows into the air bag cushion when only initiator 62 is activated to achieve full level performance. Thus, by varying the heat content of heated inflator gas that is passing into the air bag cushion by means of controlling the amount of inflator gas which flows through second filter material 84, a variable output performance inflator 10 is provided in accordance with the present invention.

Figure 4:
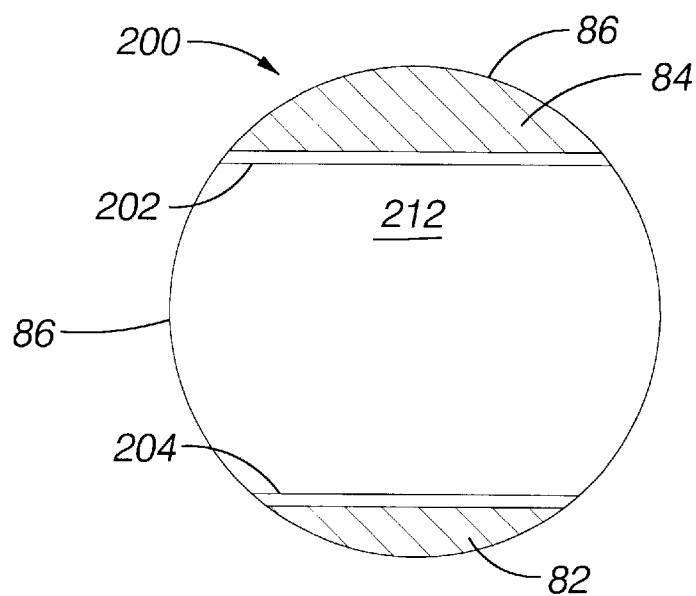
FIG. 4 is a cross-sectional view taken along the line 4—4 of FIG. 3.
Figure 3:
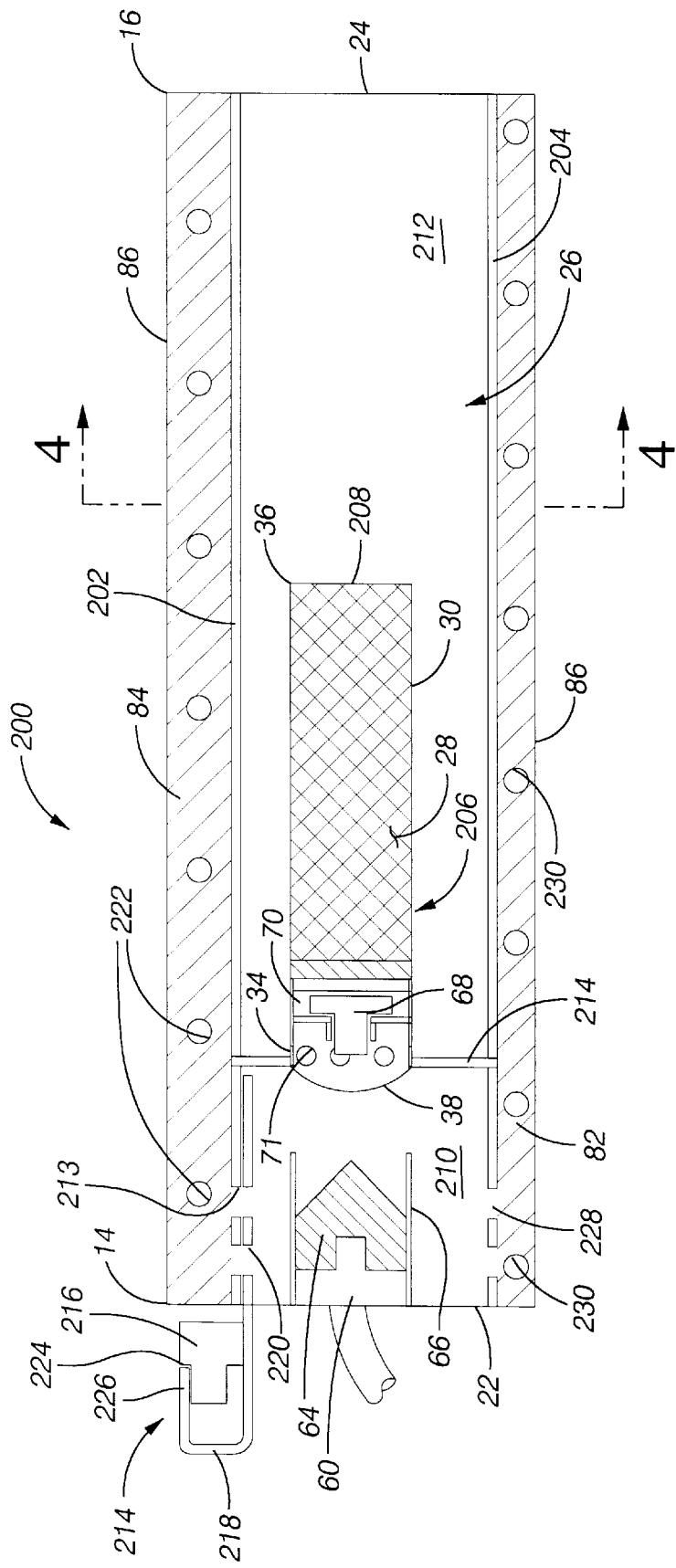
FIG. 3 is a cross-sectional side view of a second embodiment of the air bag inflator of the present invention.

Now turning to FIGS. 3–4, a second embodiment of an inflator according to the present invention is generally designated by reference numeral 200 and all elements which are common to the embodiment of FIGS. 1–2 and are present in inflator 200 of the second embodiment are referenced by the identical numerals. Inflator 200 includes annular outer wall 86 and disposed therebetween is a planar upper wall 202 and an opposing planar lower wall 204, wherein the outer periphery of walls 202 and 204 are suitably sealed to the inner side of annular outer wall 86, as shown in FIG. 4. Ends 14 and 16 of inflator 200 are closed in a sealing manner wherein first end 14 is sealed by end wall 22 and second end 16 is sealed by end wall 24. Within interior 26, which is defined by end walls 22 and 24 and upper and lower walls 202 and 204, the various materials for producing the inflation of the air bag cushion are stored. Disposed within interior 26 is a pyrotechnic heating device 206 which is similar to pyrotechnic heating device 19 of inflator 10; however, pyrotechnic heating device 206 includes at first end 34 having only a single striker 68 disposed in striker holder 70. Ends 34 and 36 of pyrotechnic heating device 206 are closed in a sealing manner wherein first end 34 is sealed by burst disk 38 and second end 36 is sealed by an end wall 208. Combustion chamber 28 is provided in pyrotechnic heating device 206 and is located between striker holder 70 and end wall 208. Interior 26 is divided into a first conduit 210 and a storage chamber 212 wherein first conduit 210 is located at first end 14 and is formed by upper wall 202, lower wall 204, end wall 22 and a bulkhead 214. Bulkhead 214 extends between cylindrical wall 30 of pyrotechnic heating device 206 and upper and lower walls 202 and 204. Within first conduit 210 is a first initiator 60 having a projectile 64 associated therewith, the actuation of which is described hereinbefore. Thus, in contrast to inflator 10, inflator 200 includes only a single initiator 60 for actuating pyrotechnic heating device 19. Storage chamber 212 is formed by upper and lower walls 202 and 204, bulkhead 214, cylindrical wall 30 and end wall 24. Storage chamber 212 is intended to store the inert gas necessary for the inflation of the air bag.

At first end 14, upper wall 202 includes at least one vent port 213 which communicates with a pyrotechnically actu-
ated vent 214 disposed adjacent vent port 213. Pyrotechnically actuated vent 214 comprises a pyrotechnically actuated squib 216 (second initiator) and pyrotechnically actuated slide 218 wherein pyrotechnically actuated slide 218 includes at least one vent 220. In a first position, vent 220 freely communicates with vent ports 213 of upper wall 202 whereby vent ports 213 and vent 220 are axially aligned and the heated inflator gas is permitted to flow from first conduit 210 through second filter 84 and then exit inflator 200 through a plurality of outlets 222 which are provided in annular outer wall 86 and are disposed adjacent second filter 84.

Pyrotechnically actuated slide 218 rides within support grooves (not shown) coupled to upper wall 202 so that vent 220 may be aligned with or offset from vent ports 213 by slidably moving pyrotechnically actuated slide 218 in a direction away from end wall 24 of inflator 200. Pyrotechnically actuated slide 218 is slidably moved in this direction by the actuation of pyrotechnically actuated squib 216, wherein squib 216 is coupled to slide 218. Squib 216 has a shoulder 224 which engages an upper portion 226 of slide 218 and upon actuation, squib 216 is propelled in the direction away from end wall 24 for a predetermined distance thereby engaging upper portion 226 and in turn causing slide 218 to move in this same direction. In this second position, vent 220 is no longer aligned with vent ports 213, thus preventing the heated inflator gas from flowing from first conduit 210 into second filter 84, and thereby providing full level performance by inflator. By preventing the heated inflator gas from flowing through vent 220 and vent ports 213, the heated inflator gas exits first conduit 210 by means of at least one vent port 228. As the heated inflator gas flows through vent ports 228, it passes through first filter 82 before exiting inflator 200 through outlets 230.

Thus, inflator 200 offers variable output performance by controlling the heat content of hot, high pressure inflator gas which flows from inflator 200 to the air bag cushion. To provide reduced level deployment performance, vent ports 213 and vent 220 are axially aligned so that heated inflator gas passes through second filter 84 as the hot inflator gas exits inflator 200. For full level deployment performance, vent ports 213 and vent 220 are offset to prevent hot, high pressure inflator gas from passing through second filter 84 and directing the gas through first filter 82 prior to exiting. For variable deployment level performance, vent ports 213 and vent 220 are partially aligned by positioning slide 218 accordingly. A controller (not shown) which actuates squib 216 may be programmed so that slide 218 is moved a predetermined distance to provide partial alignment between vent ports 213 and vent 220. Variable performance may be generated in inflator 200 by staging squib 216 to activate subsequent to the activation of initiator 60 and accordingly, a greater time differential between the activation of squib 216 and initiator 60 results in a higher level of deployment performance because the heat content of the inflator gas is greater due to a greater volume of inflator gas flowing through second filter 84.

Figure 5:
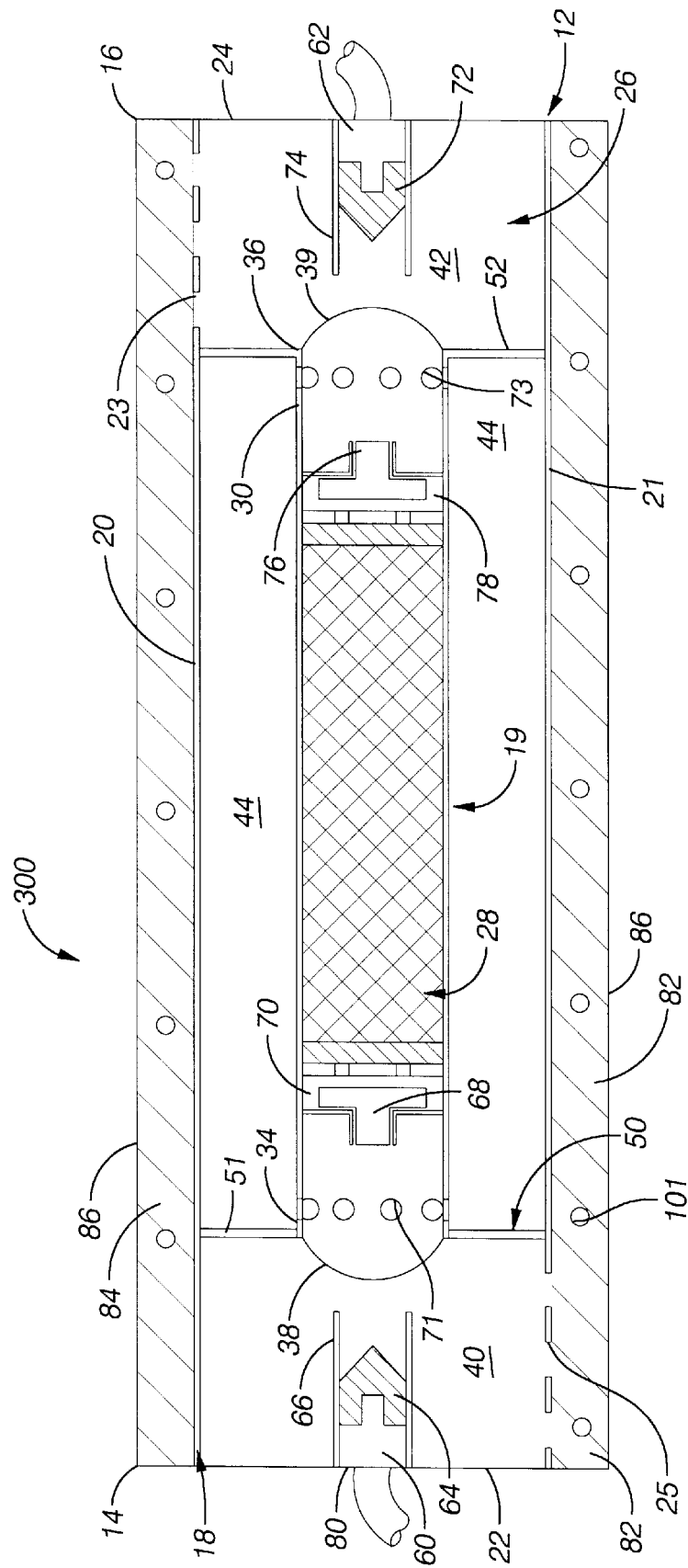
FIG. 5 is a cross-sectional side view of a third embodiment of the air bag inflator of the present invention.

Turning to FIG. 5, a third embodiment of an inflator according to the present invention is generally designated by reference numeral 300. Inflator 300 is essentially identical to inflator 10 of FIGS. 1 and 2 except that inflator 300 does not include bulkhead 48, as illustrated in FIG. 1. In place of bulkhead 48, upper portion 51 of first annular bulkhead 50 is extended to upper portion 20 of cylindrical wall 18 in a sealing manner. Thus, first conduit 40 extends between cylindrical wall 18 in this embodiment and is formed by end wall 22, cylindrical wall 18 and first annular bulkhead 50.

Figure 6:
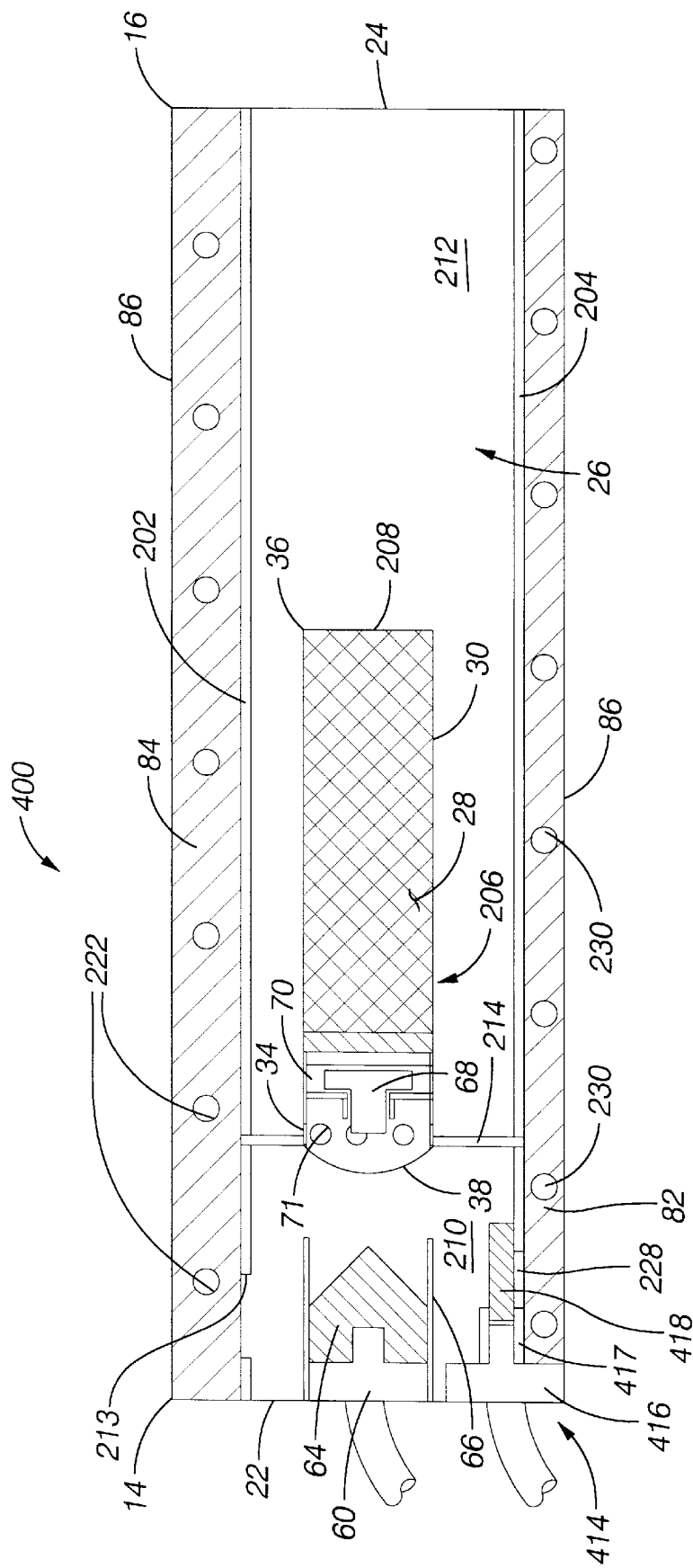
FIG. 6 is a cross-sectional side view of a fourth embodiment of the air bag inflator of the present invention.

Now turning to FIG. 6, a fourth embodiment of an inflator according to the present invention is generally designated by the referenced numeral 400 and all elements which are common to the first three embodiments are referenced by the identical numerals. At first end 14, upper wall 202 includes at least one vent port 213 which communicates with second filter 84 which comprises a heat sink/filter material having a greater heat sink capacity than second filter 82 when second filter 82 is employed in inflator 400. Inflator 300 includes a pyrotechnically actuated vent 414 at first end 14, wherein vent 414 includes a slide member 418 which in a first position is disposed adjacent at least one vent port 228 and prevents inflator gas from flowing from first conduit 210 through vent port 228.

Pyrotechnically actuated vent 414 includes a pyrotechnically actuated squib (initiator) 416 disposed within holder 417 which aligns squib 416 with slide member 418 so that actuation of squib/initiator 416 drives squib 416 into slide member 418 and slidably moves the same. Slide member 418 rides within support grooves (not shown) disposed within inflator 400 and actuation of squib 416 causes slide member 418 to be offset from vent ports 228. In this second position, vent ports 228 are opened to first conduit 210 and the hot inflator gas fluidly communicates with first filter 82, wherein first filter 82 has a lower heat sink capacity than second filter 84.

Thus, inflator 400 offers variable output performance by controlling the heat content of the high pressure inflator gas which flows from inflator 400 to the air bag cushion. To provide reduced level deployment performance, slide member 418 covers vent ports 228 preventing fluid flow therethrough and thus, the hot inflator gas exits inflator 400 by flowing through vent ports 213 and second filter 84 before exiting through outlets 222. For full level deployment performance, squib 416 is actuated and drives slide member 418 so that slide member 418 and vent port 228 offset, thereby opening the full performance path through vent port 228. When both the full level and reduced level deployment paths are open, hot inflator gas will prefer to flow along the least restrictive gas path, which in this embodiment comprises the full level deployment path because this path communicates with less heat sink/filter material. A controller (not shown) which actuates squib 416 may be programmed so that slide member 418 is driven a predetermined distance to provide partial fluid communication between first conduit 210 and first filter 82 and outlets 230. If first filter 82 is absent, then fluid communication is provided between first conduit 210 and outlets 230. Variable performance may also be provided in inflator 400 by staging squib 416 to activate subsequent to the activation of initiator 60 and accordingly, a greater time differential between the activation of squib 416 and initiator 60 results in a lower level of deployment performance because the heat content of the inflator gas is reduced due to a greater volume of inflator gas flowing through second filter 84.

While not shown in the drawings, the inflator of the present invention is typically one component of an air bag module which is installed in a passenger side of a vehicle. However, it is within the scope of the invention that inflator 10 may be one component of an air bag module which is installed in side air bag restraint systems utilizing an inflator and/or in the hub portion of a vehicle steering wheel. Inflator 10 is mounted within a central opening of an annular backing plate and communicates with the air bag cushion so that when actuated, the inflator inflates the air bag cushion under deployment conditions. It will be appreciated that the inflator of the present invention offers a cost effective method of variable output performance using only a single inflator unit. Furthermore, the inflator is of a hybrid type inflator which may be used in both driver, passenger, and side air bag modules.

It will be understood that a person skilled in the art may make modifications to the preferred embodiment shown herein within the scope and intent of the claims. While the present invention has been described in specific embodiments thereof, it is not intended to be limited thereby but is intended to cover the invention broadly within the scope and spirit of the claims. For example, while the inflator has been described hereinbefore as having a generally cylinder-like shape, it is within the scope of the present invention that the inflator may take any other form suitable for mounting to the air bag module for installation in a vehicle.

What is claimed is:

1. An air bag inflator having variable output performance for inflating an air bag cushion, the air bag inflator comprising:
   a housing having a first end wall, a second end wall, and an outer wall disposed therebetween, wherein the outer wall further includes a first outlet and a second outlet in fluid communication with the air bag cushion, the housing further including a storage chamber disposed therein, the storage chamber being receptive to a pressurized inert gas and is in fluid communication with the air bag cushion and the first outlet under reduced level deployment conditions and is in fluid communication with the second outlet and the air bag cushion under full level deployment conditions;
   a first filter material disposed in fluid communication with the first outlet for removing heat from the pressurized inert gas during reduced level deployment conditions; and
   a pyrotechnic device disposed within an interior of the housing for heating the pressurized inert gas upon activation of the air bag inflator.

2. The inflator as set forth in claim 1 further comprising:
   a second filter material disposed in fluid communication with the second outlet during full level deployment conditions, wherein the first filter material has a greater heat sink capacity than the second filter material.

3. The inflator as set forth in claim 1 further comprising:
   a first initiator disposed at the first end wall of the inflator for igniting the pyrotechnic device to the air bag cushion at a relatively high rate under full level deployment conditions; and
   a second initiator disposed at the second end wall of the inflator for igniting the pyrotechnic device to inflate the air bag cushion at a relatively low rate under reduced level deployment conditions.

4. The inflator as set forth in claim 1 wherein the pyrotechnic device comprises a pyrotechnic heater for heating the inert gas in the storage chamber, in response to activation of the first or the second initiator.

5. The inflator as set forth in claim 2 further comprising:
   a first conduit located at the first end wall, the first conduit including a first wall separating the first filter material and the storage chamber, the first separating wall having at least one first vent port in fluid communication with the first filter material and the storage chamber upon activation of the first initiator; and
   a second conduit located at the second end wall, the second conduit including a second wall separating the second filter material and the storage chamber, the second separating wall having at least second in fluid communication with the second filter material and the storage chamber upon activation of the second initiator.

6. The inflator as set forth in claim 2 wherein the pyrotechnic device further comprises:
- a first rupturable seal disposed at a first end of the pyrotechnic device, the first rupturable seal for providing selective communication between the storage chamber and the second filter material in response to the actuation of the first initiator; and
- a second rupturable seal disposed at a second end of the pyrotechnic device, the second rupturable seal for providing selective communication between the storage chamber and the first filter material in response to the actuation of the second initiator.

7. The inflator as set forth in claim 3 wherein the reduced level deployment of the air bag cushion is provided by the activation of the first and second initiators causing the inert gas to fluidly communicate with a second filter material and the first filter material before exiting the inflator into the air bag cushion, the second filter material being disposed in fluid communication with the second outlet, wherein the first filter material has a greater heat sink capacity than the second filter material.

8. The inflator as set forth in claim 7 wherein the second initiator is activated at a predetermined time subsequent to the activation of the first initiator.

9. The inflator as set forth in claim 1 further comprising:
- a first conduit located proximate the first end wall, the first conduit defining a first selective path for delivering the inert gas from the storage chamber to the first filter material via a first vent port;
- a second conduit located proximate the second end wall, the second conduit defining a second selective path for delivering the inert gas from the storage chamber to the air bag cushion via a second vent port; and
- a movable vent slide having at least one vent opening in selective fluid communication with the first vent port, the vent slide being disposed at the first vent port whereby under reduced level deployment conditions the vent opening and the first vent port are aligned so that inert gas may fluidly communicate with the first filter material and under full level deployment conditions the vent opening is offset from the first vent port thereby preventing the inert gas from fluidly communicating with the first filter material.

10. The inflator as set forth in claim 9 further comprising:
- a squib engaging the vent slide for moving the slide member relative to the outer wall upon activation under full level deployment conditions to limit fluid communication between the first conduit and the first filter material.

11. The inflator as set forth in claim 10 further comprising:
- a first rupturable burst disk sealing a first end of the pyrotechnic device proximate the first conduit; and
- an initiator disposed within the first conduit for rupturing the first burst disk and activating the pyrotechnic device.

12. A method of variably inflating an air bag cushion using an air bag inflator, the method comprising:
- heating an inert gas by a pyrotechnic device, wherein the inert gas is disposed within a storage chamber located within the air bag inflator;
- opening a first fluid flow path to direct the heated gas from the storage chamber to at least one outlet for inflating the air bag cushion under reduced level deployment conditions, wherein the first fluid flow path includes a first filter material disposed therein for dissipating heat from the heated gas; and
- opening a second fluid flow path to direct the heated gas from the storage chamber to the at least one outlet for inflating the air bag cushion under full level deployment conditions.

13. The method as set forth in claim 12 wherein the second fluid flow path includes a second filter material disposed therein for dissipating heat from the heated gas, wherein the first filter material has a greater heat sink capacity than the second filter material.

14. The method as set forth in claim 12 wherein the opening of the first fluid flow path comprises:
- activating a first initiator for rupturing a first burst disk disposed within the first fluid flow path; and wherein the opening of the second fluid flow path comprises:
- activating a second initiator for rupturing a second burst disk disposed within the second fluid flow path.

15. The method as set forth in claim 12 wherein heating the inert gas comprises:
- activating one of a first initiator or second initiator for actuating the pyrotechnic device.

* * * * *